United States Patent
Garhart

(10) Patent No.: US 9,944,061 B2
(45) Date of Patent: Apr. 17, 2018

(54) PLASMA DETECTION TRACERS FOR PROCESS MONITORING

(71) Applicant: Sikorsky Aircraft Corporation, Stratford, CT (US)

(72) Inventor: Jonathan K. Garhart, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/400,563

(22) Filed: Jan. 6, 2017

(65) Prior Publication Data

US 2017/0197398 A1   Jul. 13, 2017

Related U.S. Application Data

(60) Provisional application No. 62/276,298, filed on Jan. 8, 2016.

(51) Int. Cl.
*B32B 41/00* (2006.01)
*B32B 37/14* (2006.01)
*B32B 37/12* (2006.01)

(52) U.S. Cl.
CPC .............. *B32B 37/14* (2013.01); *B32B 37/12* (2013.01); *B32B 2310/0831* (2013.01); *B32B 2310/14* (2013.01)

(58) Field of Classification Search
CPC . B32B 37/14; B32B 37/12; B32B 2310/0831; B32B 2310/14
USPC .......................... 156/64, 350, 351, 378, 379
See application file for complete search history.

(56) References Cited

U.S. PATENT DOCUMENTS

| 4,740,383 A | 4/1988 | Mita et al. |
| 5,455,061 A | 10/1995 | Matossian et al. |
| 6,079,351 A | 6/2000 | Lonno |
| 2015/0258765 A1 | 9/2015 | Van Voast et al. |
| 2016/0349222 A1* | 12/2016 | Mori ................. H01J 37/32917 |

FOREIGN PATENT DOCUMENTS

WO        2015122425 A1    8/2015

\* cited by examiner

*Primary Examiner* — Michael N Orlando
*Assistant Examiner* — Joshel Rivera
(74) *Attorney, Agent, or Firm* — Cantor Colburn LLP

(57) ABSTRACT

An apparatus and method for bonding a member to a substrate is disclosed. A surface of the member is prepared by applying an element to the surface. The element includes a dye agent that changes color when exposed to a level of plasma radiation consistent with preparing the surface for bonding. The surface is exposed to the plasma radiation and is inspected to see whether or not a change in a color of the dye agent occurs. After the dye agent changes color; the surface is bonded to the substrate.

12 Claims, 1 Drawing Sheet

PLASMA DETECTION TRACERS FOR PROCESS MONITORING

CROSS REFERENCE TO RELATED APPLICATIONS

The present invention claims priority to U.S. Provisional Application Ser. No. 62/276,298, filed Jan. 8, 2016, the contents of which are incorporated herein by reference in their entirety.

BACKGROUND OF THE INVENTION

The present invention is directed to bonding processes and, in particular, to monitoring a condition of a surface during a preparation stage of a bonding process.

Structural bonding of composites is currently being pursued as a replacement for conventional fasteners in assembly of aircraft and aircraft components. During a structural bonding process, surface preparation is performed to ensure that the bonding surfaces are free from oxides and are therefore receptive to adhesive materials. One method of surface preparation uses plasma discharge to atomically cleanse a bonding surface of oxygen. However, it is necessary to determine that the plasma discharge has sufficiently cleansed the bonding surface of oxygen prior to performing a structural bonding step.

Accordingly, it is desirable to inspect the surface to determine whether or not the surface has been sufficiently conditioned by plasma exposure before bonding.

SUMMARY OF THE INVENTION

According to one embodiment, a method of bonding a member to a substrate is provided that includes: preparing a surface of the member with a dye agent that changes color when exposed to a selected level of plasma radiation; exposing the surface to the plasma radiation; inspecting the surface for a change in a color of the dye agent; and bonding the surface to the substrate after the dye agent changes color.

According to another embodiment, an apparatus for determining a condition of a surface for bonding is provided, the apparatus including an element on the surface; and a dye agent in the element that changes color when exposed to a level of plasma radiation consistent with preparing the surface for bonding.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same.

Figure 1:
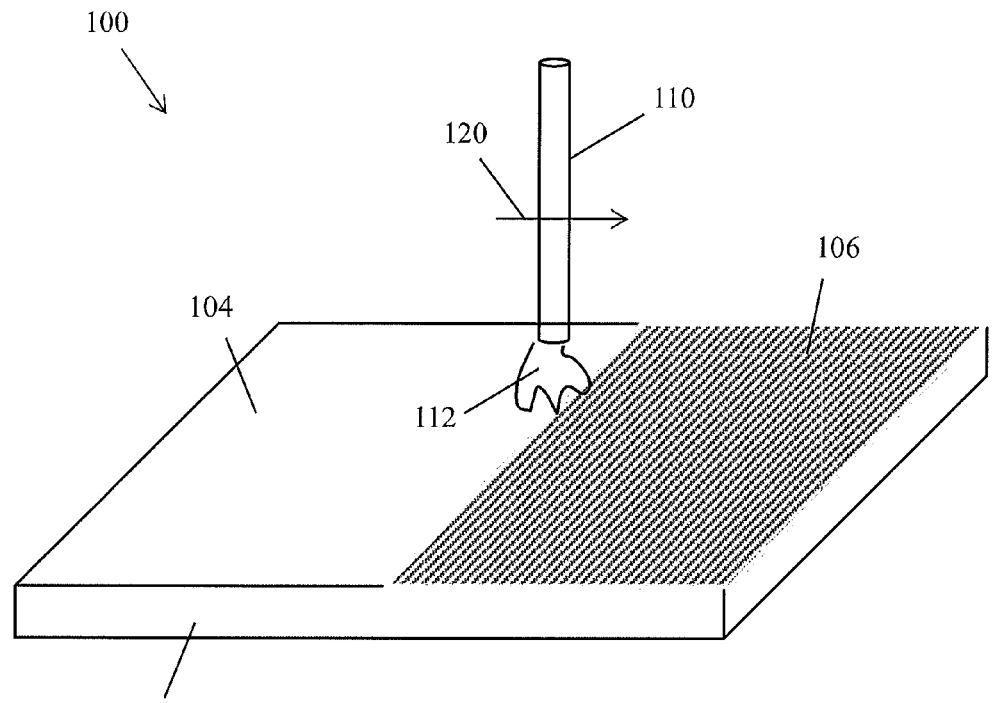
FIG. 1 illustrates a plasma treatment process for preparing a surface of a member for adhesive bonding in one embodiment of the present invention.

FIG. 1 illustrates a plasma treatment process 100 for preparing a surface 104 of a member 102 for adhesive bonding to a substrate (not shown) in one embodiment of the present invention. The member 102 is generally a composite material that is used for example, in aircraft and/or aircraft components. However, components of other structures can be bonded using the methods disclosed herein. The surface 104 of the member 102 is bonded to the substrate generally by using an adhesive material applied between the surface 104 and the substrate. The composite material of surface 104 generally has an oxide layer 106 due to oxidation processes occurring prior to the plasma treatment process 100. Without treatment, the oxide layer 106 interferes with the adhesive material and can therefore lead to poor bonding. Thus, the plasma treatment process 100 removes the oxide layer 106 from the bonding surface 104 prior to applying the adhesive material. In the plasma treatment process 100, a plasma gun 110 is maintained at a selected distance to the surface 104 and provides plasma radiation 112 to the bonding surface 104 for a selected time duration. In one embodiment, the plasma gun 110 is moved across the surface 104 in a selected direction, indicated by arrow 120. The distance between the plasma gun 110 and the surface 104 and the exposure time of the surface 104 to the plasma radiation 112 are parameters that are selected in order to provide a suitable exposure to the plasma radiation 112 for removing oxides from the surface 104. The plasma radiation 112 is generally concentrated in the ultraviolet region of the electromagnetic spectrum.

Figure 2:
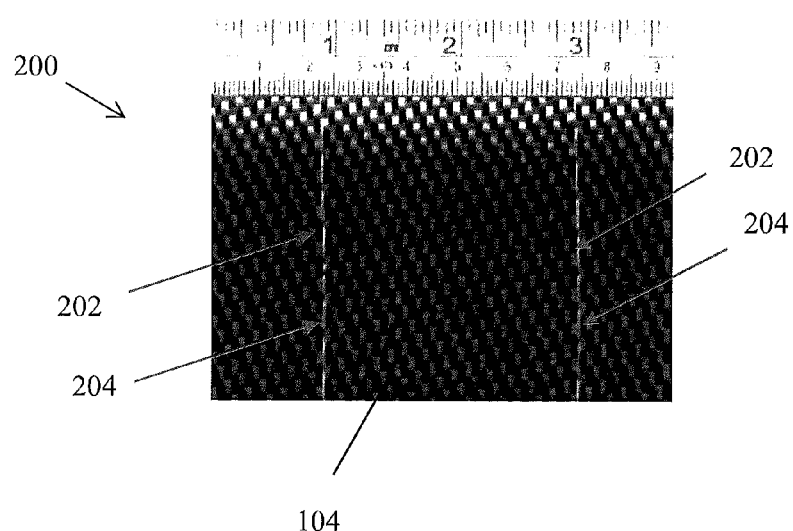
FIG. 2 shows a top view of the bonding surface of the member.

FIG. 2 shows a top view 200 of the bonding surface 104 of member 102. The bonding surface 104 includes tracer fibers 202 that are woven into the surface 104 of the member 102. The tracer fibers 202 are shown as being spaced apart by about 5 centimeters. However, any spacing of the tracer fibers 202 that is suitable can be used in alternate embodiments. The tracer fibers 202 are used to provide a visual cue to an operator of an orientation of fibers of the composite material at the surface 104. The tracer fibers 202 can be made from a thermoplastic material and can contain or be infused with a dye agent 204 that is used to indicate the condition of the bonding surface 104. In various embodiments, the dye agent 204 changes its color when exposed to plasma radiation 112. For example, the dye agent 204 can be white prior to exposure to plasma radiation 112 and blue after exposure to plasma radiation 112. While a tracer fiber 202 is discussed herein as an element for applying the dye agent 204 to the surface 104, any number of elements can be used to apply the dye agent 204 to the surface 104 in place of the tracer fiber 202, in alternate embodiments.

The dye agent 204 can be selected so that the radiation conditions under which the dye agent 204 changes color is the same as the radiation conditions necessary to properly prepare the surface 104 (e.g., remove the oxide layer) for bonding purposes. An operator can therefore determine that the surface 102 is prepared for a subsequent bonding step by visually inspecting the color of the tracer fibers 202. In one embodiment, the radiation conditions include that the surface 104 is exposed to ultraviolet radiation. In another embodiment, the radiation conditions include that the surface 104 is exposed to ultraviolet radiation at a selected intensity. In yet another embodiment, the radiation conditions includes that the surface 104 is exposed to ultraviolet radiation at a selected intensity and for a selected exposure time. The present invention therefore provides a quick and simple method for inspecting treated surfaces for sufficient preparation for bonding without the use of inspection equipment. Visual inspection can be conducted during the preparation process so that insufficient preparation of the surface 104 can be addressed before the surface 104 is passed on to the bonding stage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of bonding a member to a substrate, comprising:
    applying a dye agent to a tracer fiber, wherein the dye agent changes color when exposed to a selected level of plasma radiation;
    weaving the tracer fiber into a surface of the member;
    exposing the surface to the plasma radiation;
        inspecting the tracer fiber for a change in a color of the dye agent; and
    bonding the surface to the substrate after the dye agent changes color.

2. The method of claim 1, wherein the tracer fiber is made of a thermoplastic material.

3. The method of claim 1, wherein the dye agent changes color when exposed to radiation at ultraviolet wavelengths.

4. The method of claim 1, wherein the selected level of radiation includes a selected intensity of radiation at ultraviolet wavelengths.

5. The method of claim 3, further comprising exposing the surface to the selected level of radiation for a selected amount of time.

6. The method of claim 5, wherein the selected amount of time is an amount of time for removing oxides from the surface using the plasma radiation.

7. An apparatus for determining a condition of a surface for bonding, comprising:
    tracer fiber woven into the surface; and
    a dye agent in the tracer fiber that changes color when exposed to a level of plasma radiation consistent with preparing the surface for bonding.

8. The apparatus of claim 7, wherein the tracer fiber is a thermoplastic material.

9. The apparatus of claim 7, wherein the level of radiation is a level at which an oxide layer is removed from the surface by the plasma radiation.

10. The apparatus of claim 7, wherein the dye agent change color when exposed to ultraviolet radiation.

11. The apparatus of claim 7, wherein the dye agent changes color when exposed to plasma radiation at a selected intensity at ultraviolet wavelengths.

12. The apparatus of claim 7, wherein the dye agent changes color when exposed to plasma radiation at a selected intensity at ultraviolet wavelength for a selected exposure time.

\* \* \* \* \*